United States Patent
Lan et al.

(10) Patent No.: US 8,373,661 B2
(45) Date of Patent: *Feb. 12, 2013

(54) INPUT APPARATUS AND OPERATION METHOD THEREOF

(75) Inventors: Yung-Sung Lan, Kaohsiung County (TW); Kuen-Chiuan Cheng, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 431 days.

This patent is subject to a terminal disclaimer.

(21) Appl. No.: 12/629,875

(22) Filed: Dec. 2, 2009

(65) Prior Publication Data
US 2011/0032212 A1 Feb. 10, 2011

(30) Foreign Application Priority Data
Aug. 10, 2009 (TW) ................. 98126809 A

(51) Int. Cl.
*G06F 3/042* (2006.01)
(52) U.S. Cl. .................... 345/163; 345/156; 345/157
(58) Field of Classification Search ............ 345/166, 345/163
See application file for complete search history.

(56) References Cited

U.S. PATENT DOCUMENTS

| | | | |
|---|---|---|---|
| 5,463,387 A | 10/1995 | Kato | |
| 5,779,211 A | 7/1998 | Bird | |
| 6,269,753 B1 | 8/2001 | Roddan | |
| 6,322,033 B1 | 11/2001 | Lee | |
| 6,337,679 B1 * | 1/2002 | Chou | 345/156 |
| 6,352,303 B1 | 3/2002 | Hope | |
| 6,504,528 B1 | 1/2003 | Kermani et al. | |
| 6,644,605 B1 | 11/2003 | Tyner | |
| 7,058,432 B2 * | 6/2006 | Nishimoto | 455/575.1 |
| 7,121,214 B1 | 10/2006 | Toltzman et al. | |
| 7,724,238 B2 * | 5/2010 | Daniel et al. | 345/163 |
| 7,796,118 B2 * | 9/2010 | Groom et al. | 345/163 |
| 7,942,745 B2 * | 5/2011 | Ikeda et al. | 463/38 |
| 8,077,147 B2 * | 12/2011 | Krah et al. | 345/163 |
| 2002/0155857 A1 * | 10/2002 | Nishimoto | 455/550 |
| 2004/0012568 A1 | 1/2004 | Velikov et al. | |
| 2004/0150620 A1 | 8/2004 | Tsen | |
| 2007/0146318 A1 * | 6/2007 | Juh et al. | 345/157 |
| 2008/0084394 A1 * | 4/2008 | Kang | 345/166 |
| 2009/0200148 A1 * | 8/2009 | Honmatsu et al. | 200/5 A |
| 2010/0045604 A1 * | 2/2010 | Kim | 345/163 |

* cited by examiner

*Primary Examiner* — Van Chow
(74) *Attorney, Agent, or Firm* — Jianq Chyun IP Office

(57) ABSTRACT

An input apparatus including an optical mouse module and a mouse pad module is provided. The optical mouse module includes a light source and an optical sensor. The light source is adapted to emit a light beam. The optical sensor has a sensible distance. The mouse pad module is disposed on the optical mouse module. The mouse pad module includes a sliding sheet elastically coupled to the optical mouse module. The sliding sheet is adapted to move in a three-dimensional space. The optical sensor and the sliding sheet are arranged in an arrangement direction. An operation method of the input apparatus is also provided.

14 Claims, 13 Drawing Sheets

INPUT APPARATUS AND OPERATION METHOD THEREOF

CROSS-REFERENCE TO RELATED APPLICATION

This application claims the priority benefit of Taiwan application serial no. 98126809, filed Aug. 10, 2009. The entirety of the above-mentioned patent application is hereby incorporated by reference herein and made a part of specification.

BACKGROUND

1. Technical Field

The disclosure relates to an input apparatus and an operation method thereof. More particularly, the disclosure relates to an optical input apparatus and an operation method thereof.

2. Description of Related Art

With development of electronic technology, many electronic products trend to be light, slim, short and small. For example, one of development objectives of a notebook computer is miniaturization to facilitate carrying. However, though the notebook computer is already miniaturized, a mouse used to control a cursor on a screen has to be placed on a plane for usage. If the notebook computer is used at a place other than a desktop (for example, on a laptop), it is generally hard to find a plane for placing the mouse. Therefore, in some of the notebook computers, a touch platform or a track point is configured on a surface adjacent to a keyboard for controlling the cursor. However, the touch platform occupies a surface area of the notebook computer, which may limit the notebook computer to implement features of lightness, slimness, shortness and smallness. Moreover, compared to an operation mode of the mouse, an operation mode of the touch platform and the track point is inconvenient for general users, so that the user cannot accurately and quickly control the cursor.

In addition, when the notebook computer is used for briefing presentation, whenever the cursor is required to be moved, the user has to go back to the desk to move the mouse placed on the desktop, or operate the touch platform or the track point of the notebook computer, so that the briefing is not fluent due to the temporary interruption, and time for the conference is prolonged, which may lead to a low efficiency conference. One kind of a conventional mouse applies a sensing system composed of an accelerometer and a gyroscope to achieve a handheld operation without operating the mouse on a plane. However, the sensing system composed of the accelerometer and the gyroscope is rather expensive, so that such kind of mouse is lack of market competitiveness.

SUMMARY

The disclosure is directed to an input apparatus suitable for a handheld operation.

The disclosure is directed to an operation method of an input apparatus, which can implement a handheld operation.

The disclosure provides an input apparatus including an optical mouse module and a mouse pad module. The optical mouse module includes a light source and an optical sensor. The light source is adapted to emit a light beam, and the optical sensor has a sensible distance. The mouse pad module is disposed on the optical mouse module. The mouse pad module includes a sliding sheet elastically coupled to the optical mouse module. The sliding sheet is adapted to move in a three-dimensional space. The optical sensor and the sliding sheet are arranged along an arrangement direction. When the sliding sheet is pressed to enter within the sensible distance of the optical sensor and moves along a direction perpendicular to the arrangement direction, the sliding sheet reflects the light beam to the optical sensor, so that the optical sensor senses a movement of the sliding sheet relative to the optical mouse module along a direction perpendicular to the arrangement direction. When the sliding sheet is not pressed, an elastic force formed by coupling the sliding sheet to the optical mouse module rebounds the sliding sheet back to outside of the sensible distance, so that the optical sensor is unable to sense a movement of the sliding sheet relative to the optical mouse module along the direction perpendicular to the arrangement direction.

The disclosure provides an operation method of an input apparatus. The input apparatus includes an optical mouse module and a mouse pad module. The optical mouse module includes a light source and an optical sensor, wherein the optical sensor has a sensible distance. The mouse pad module is disposed on the optical mouse module. The mouse pad module includes a sliding sheet elastically coupled to the optical mouse module. The optical sensor and the sliding sheet are arranged along an arrangement direction. The operation method of the input apparatus includes following steps. First, a first finger presses the sliding sheet to enter within the sensible distance of the optical sensor, and the first finger pushes the sliding sheet along a direction perpendicular to the arrangement direction. Next, the first finger leaves the sliding sheet or a pressing force of the first finger to the sliding sheet is less than an elastic restoring force formed by coupling the sliding sheet to the optical mouse module, so that the sliding sheet is rebounded back to outside of the sensible distance due to the elastic restoring force formed by coupling the sliding sheet to the optical mouse module.

Since in the input apparatus according to the embodiment of the disclosure, the optical mouse module and the mouse pad module are integrated, a handheld operation of the input device can be implemented, so that a usage convenience is improved. In the operation method of the input apparatus according to the embodiment of the disclosure, the finger can push the sliding sheet to move a cursor on the screen, so as to implement the handheld operation.

In order to make the aforementioned and other features of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The embodiment of the disclosure provides an input apparatus integrating an optical mouse module and a mouse pad module, and an operation method thereof. Therein, a sliding sheet of the mouse pad module can be pressed by a finger of a user to enter a sensible distance of an optical sensor of the optical mouse module, so that a movement of the sliding sheet can be sensed by the optical sensor. Moreover, when the user's finger leaves the sliding sheet, the sliding sheet is rebounded back to outside of the sensible distance of the optical sensor, so that the optical sensor cannot sense the movement of the sliding sheet, so as to reset the sliding sheet without moving a cursor on a screen. Such operation method is simple, and is easy to be accepted by the user. Moreover, since the optical mouse module and the mouse pad module are elastically coupled, a handheld operation can be implemented without placing the mouse on a plane as that does of a conventional technique, so that a usage convenience thereof is improved. Embodiments are provided below to describe the input apparatus of the disclosure in detail.

Figure 1A:
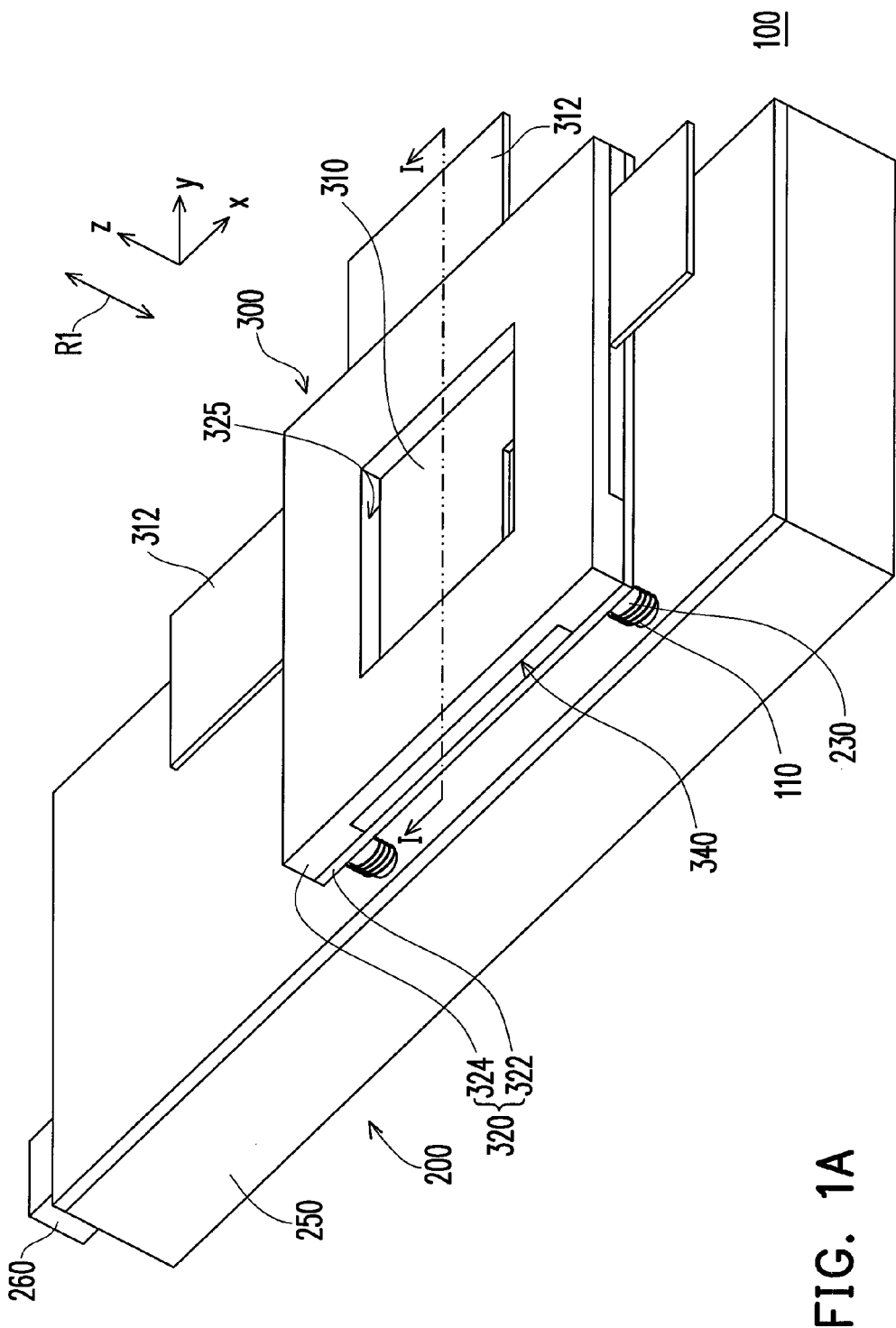
FIG. 1A is a three-dimensional diagram illustrating an input apparatus according to an embodiment of the disclosure.
Figure 1B:
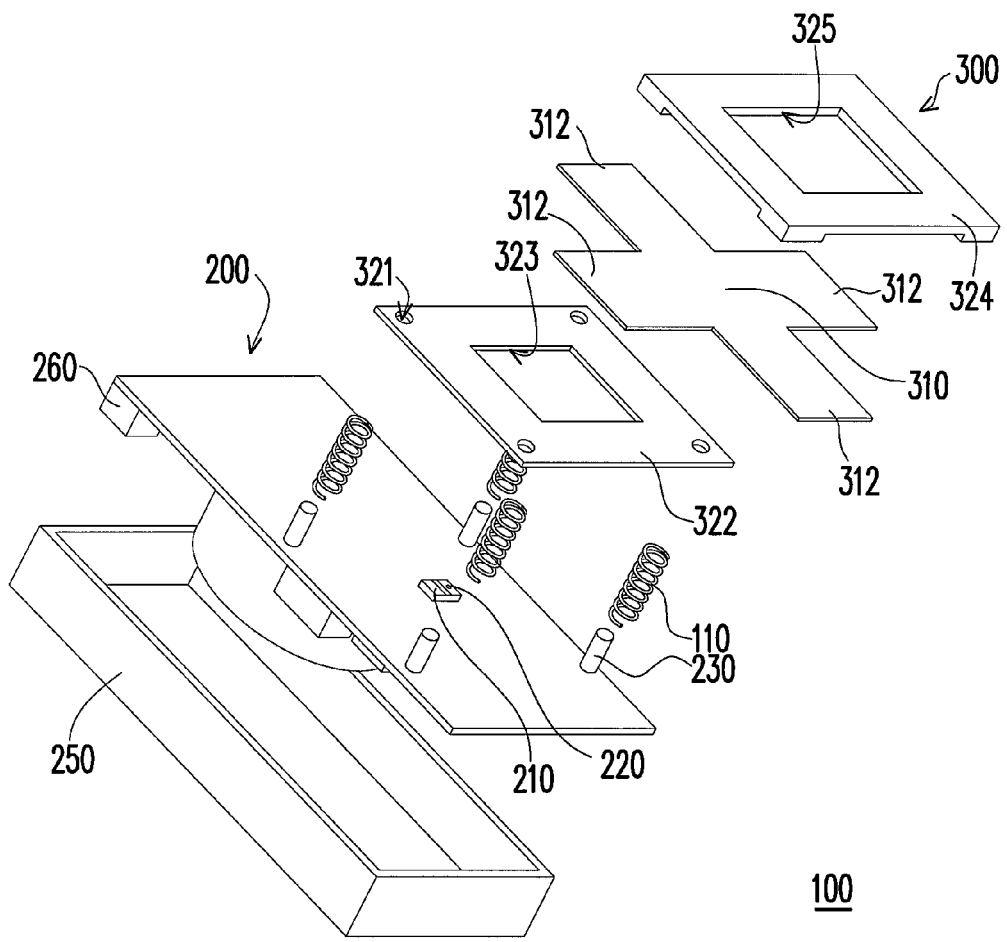
FIG. 1B is an exploded diagram of an input apparatus of FIG. 1A.
Figure 1C:
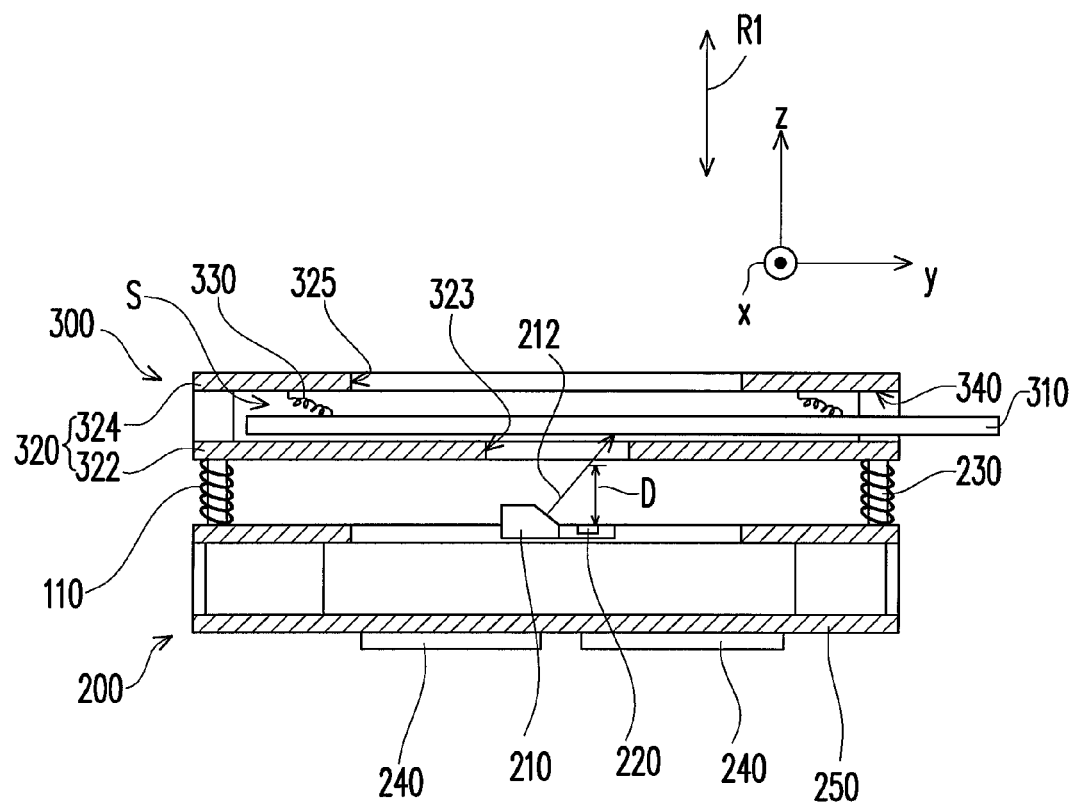
FIG. 1C is cross-sectional view of an input apparatus of FIG. 1A along line I-I.

FIG. 1A is a three-dimensional diagram illustrating an input apparatus according to an embodiment of the disclosure. FIG. 1B is an exploded diagram of the input apparatus of FIG. 1A, and FIG. 1C is cross-sectional view of the input apparatus of FIG. 1A along line I-I. Referring to FIG. 1A, FIG. 1B and FIG. 1C, the input apparatus 100 of the present embodiment includes an optical mouse module 200 and a mouse pad module 300. The optical mouse module 200 includes a light source 210 and an optical sensor 220, wherein the light source 210 is adapted to emit a light beam 212, and the optical sensor 220 has a sensible distance D. The mouse pad module 300 is disposed on the optical mouse module 200. The mouse pad module 300 includes a sliding sheet 310 elastically coupled to the optical mouse module 200, wherein the sliding sheet 310 is adapted to move in a three-dimensional space. In detail, the three-dimensional space where the input apparatus 100 is located can be defined by an x-axis, a y-axis and a z-axis perpendicular to each other (as that shown in FIG. 1A and FIG. 1C). The optical sensor 220 and the sliding sheet 310 are arranged along an arrangement direction R1, i.e. along a z direction.

When the sliding sheet 310 is pressed to enter within the sensible distance D of the optical sensor 220 and moves along a direction perpendicular to the arrangement direction R1, for example, moves along an x direction, a y direction or any direction parallel to a x-y plane, the sliding sheet 310 reflects the light beam 212 to the optical sensor 220, so that the optical sensor 220 senses a movement of the sliding sheet 310 relative to the optical mouse module 200 along a direction perpendicular to the arrangement direction R1. In the present embodiment, the optical sensor 220 is, for example, an image sensor. By comparing images of the sliding sheet 310 that are sensed by the image sensor at different time, a moving direction and a moving distance of the sliding sheet 310 can be determined. When the sliding sheet 310 is not pressed, an elastic force formed by coupling the sliding sheet 310 to the optical mouse module 200 rebounds the sliding sheet 310 back to outside of the sensible distance D, so that the optical sensor 220 cannot sense a movement of the sliding sheet 310 relative to the optical mouse module 200 along the direction perpendicular to the arrangement direction R1.

In the present embodiment, the mouse pad module 300 further includes a casing 320 elastically coupled to the optical mouse module 200. The casing 320 is adapted to move relatively to the optical mouse module 200 along the arrangement direction R1, i.e. along a +z direction or a −z direction. Moreover, the casing 320 has a containing space S for containing at least a part of the sliding sheet 310. As shown in FIG. 1A and FIG. 1C, a part of the sliding sheet 310 is contained within the containing space S.

In detail, in the present embodiment, the casing 320 includes a lower cover 322 and an upper cover 324. The lower cover 322 is disposed on the optical mouse module 200, and is adapted to move along the arrangement direction R1, wherein the lower cover 322 has a light pervious opening 323. The upper cover 324 is connected to the lower cover 322, and is elastically coupled to the optical mouse module 200. The sliding sheet 310 is disposed between the lower cover 322 and the upper cover 324, and the light beam 212 is adapted to be transmitted to the sliding sheet 310 through the light pervious opening 323. The upper cover 324 may have an operation opening 325, so that the user's finger can press the sliding sheet 310 through the operation opening 325. Moreover, the user's finger can move in the operation opening 325 to push the sliding sheet 310.

In the present embodiment, the input apparatus 100 further includes at least one elastic device 110, and in the figures, a plurality of elastic device 110 is taken as an example. The elastic device 110 is coupled to the optical mouse module 200 and the casing 320, and in the present embodiment, the elastic device 110 is coupled to the optical mouse module 200 and the upper cover 324. However, in other embodiments, the elastic device 110 can also be coupled to the optical mouse module 200 and the lower cover 322. In the present embodiment, the elastic device 110 satisfies a condition that when the elastic device 100 reaches a maximum compression amount, a distance between the sliding sheet 310 and the optical sensor 220 just satisfies an optimal sensing condition, i.e. the sliding sheet 310 is located within the sensible distance D of the optical sensor 220. In the present embodiment, the lower cover 322 has at least one positioning hole 321, and in FIG. 1B, a plurality of positioning holes 321 is taken as an example. The optical mouse module 200 has at least one positioning pillar 230, and in FIG. 1B, a plurality of positioning pillars 230 is taken as an example. The positioning pillars 230 are respectively inserted in the positioning holes 321. Each of the elastic devices 110 is, for example, a compression spring surrounding the positioning pillar 230. In the present embodiment, the elastic devices 110 penetrate through the positioning holes 321. However, in other embodiments, the elastic devices 110 can also be elastic sheets or connectors formed by elastic materials, and can be disposed at other positions for coupling the casing 320 and the optical mouse module 200.

When the sliding sheet 310 is pressed, the sliding sheet 310 pushes the casing 320 to move towards the optical mouse module 200, and now the sliding sheet 310 is pressed to enter within the sensible distance D of the optical sensor 220. When the sliding sheet 310 is not pressed, the elastic force of the elastic device 110 rebounds the casing 320 back towards a direction apart from the optical mouse module 200, and now the casing 320 pushes the sliding sheet to outside of the sensible distance D of the optical sensor 220.

In the present embodiment, the mouse pad module 300 further includes at least one elastic device 330, and in FIG. 1C, a plurality of elastic devices 330 is taken as an example. The elastic device 330 is coupled to the casing 320 and the sliding sheet 310. When the sliding sheet 310 is not pressed, a restoring force of the elastic device 330 is adapted to rebound the sliding sheet 310 back to a specific position relatively to the casing 320 along a direction substantially perpendicular to the arrangement direction R1. In the present embodiment, the elastic device 330 is, for example, a spring. However, in other embodiments, the elastic device 330 can also be a connector formed by elastic material, an elastic sheet or other suitable elastic devices.

In the present embodiment, the casing 320 has at least one side opening 340, and in the figures, four side openings 340 are taken as an example. The side openings 340 are located between the lower cover 322 and the upper cover 324. The sliding sheet 310 may have at least one side protrusion 312, and in the figures, four side protrusions 312 are taken as an example. In other words, the sliding sheet 310, for example, has a cross shape. The side protrusions 312 are adapted to protrude out of the casing 320 through the side openings 340. In the present embodiment, a width of the side opening 340 along a direction perpendicular to the arrangement direction R1 is greater than a width of the protrusion 312 along the direction perpendicular to the arrangement direction R1. According to the designs that the sliding sheet 310 has the cross shape, and the width of the side opening 340 is greater than the width of the protrusion 312, the sliding sheet 310 can be moved relatively to the casing 320 along a direction substantially perpendicular to the arrangement direction R1 without falling out of the casing 320.

In the present embodiment, the light source 210 and the optical sensor 220 are disposed at a side of the optical mouse module 200 facing to the mouse pad module 300. The optical mouse module 200 further includes at least one button 240, and in the figures, a plurality of the buttons 240 is taken as an example. The buttons 240 are disposed at a side of the optical mouse module 200 away from the mouse pad module 300. In detail, the buttons 240 are, for example, disposed on a casing 250 of the optical mouse module 200. Moreover, in the present embodiment, the optical mouse module 200 further includes a signal output module 260 electrically connected to the optical sensor 220. The signal output module 260 is, for example, a wireless signal output module adapted to convert an electrical signal generated in the optical mouse module 200 into a wireless signal, and transmit the wireless signal to a wireless signal receiver (not shown) of a computer (not shown), so as to control a movement of the cursor on the screen.

FIGS. 2A-2E are schematic diagrams illustrating steps of an operation method of an input apparatus according to an embodiment of the disclosure. Referring to FIGS. 2A-2E, the operation method of the disclosure can be applied to the aforementioned input apparatus 100 (shown in FIG. 1A). Before the operation is started, a state of the input apparatus 100 is as that shown in FIG. 2A, and now the sliding sheet 310 is located outside the sensible distance D of the optical sensor 220. The operation method of the input apparatus includes following steps. First, referring to FIG. 2B, a first finger 50 presses the sliding sheet 310 to enter within the sensible distance D of the optical sensor 220. Now, the light beam 212 emitted from the light source 210 is reflected by the sliding sheet 310, and is transmitted to the optical sensor 220 through the light pervious opening 323. Therefore, the optical sensor 220 can sense a surface image of the sliding sheet 310. To be specific, the first finger 50 can press the sliding sheet 310 through the operation opening 325.

Figure 2A:
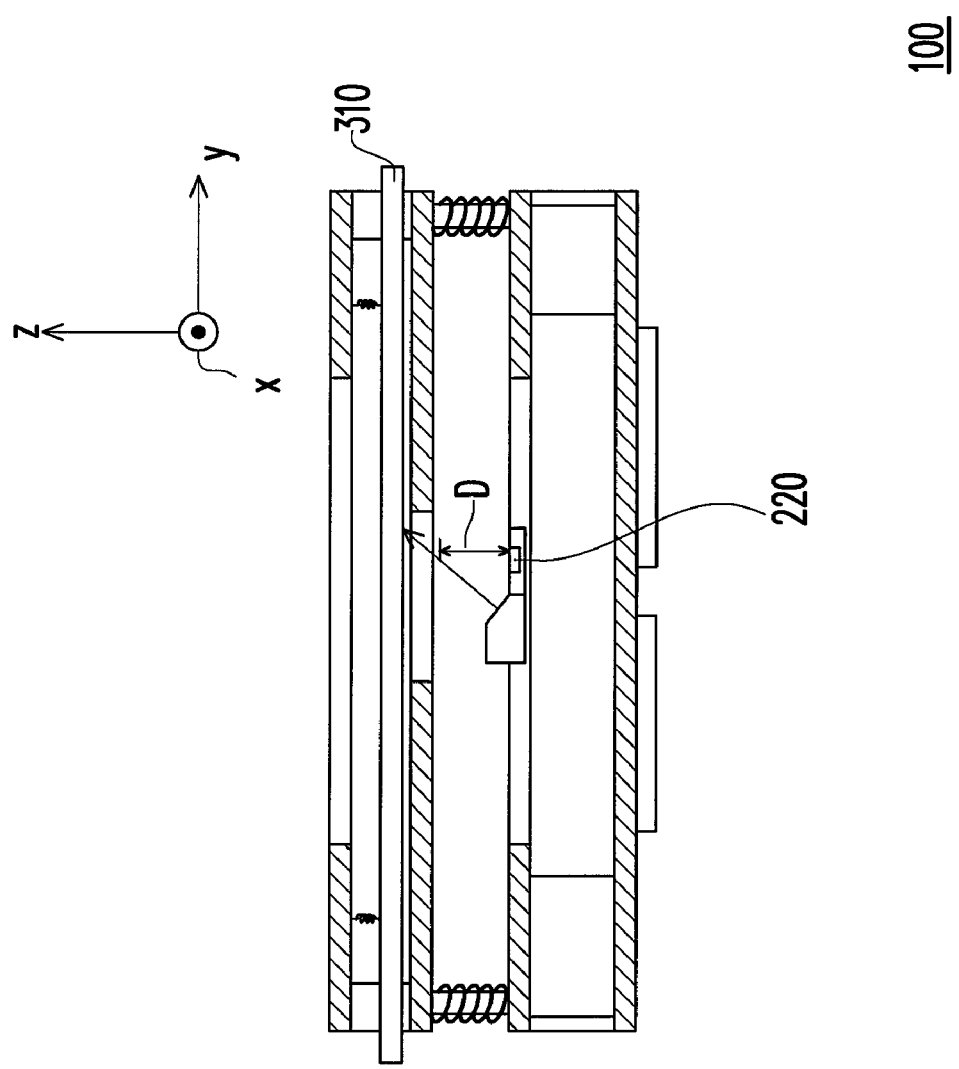
FIGS. 2A-2E are schematic diagrams illustrating steps of an operation method of an input apparatus according to an embodiment of the disclosure.
Figure 2B:
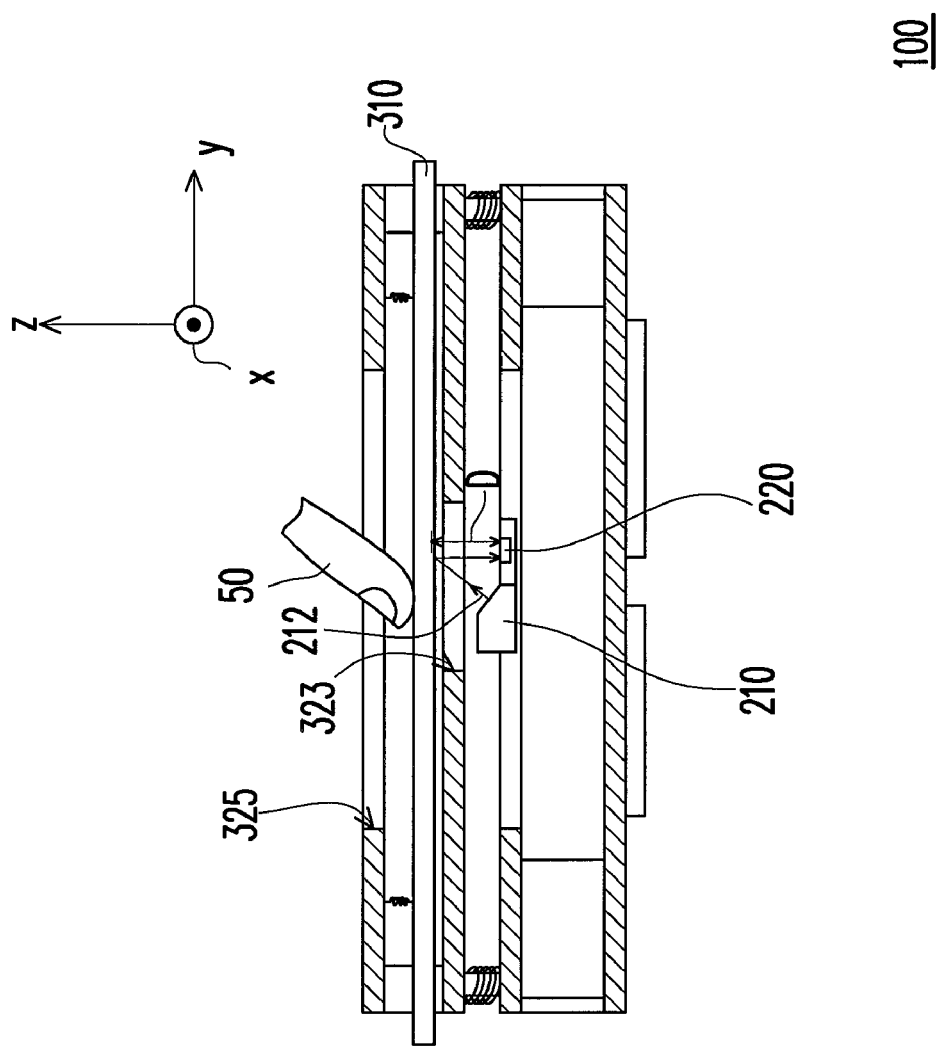
Figure 2C:
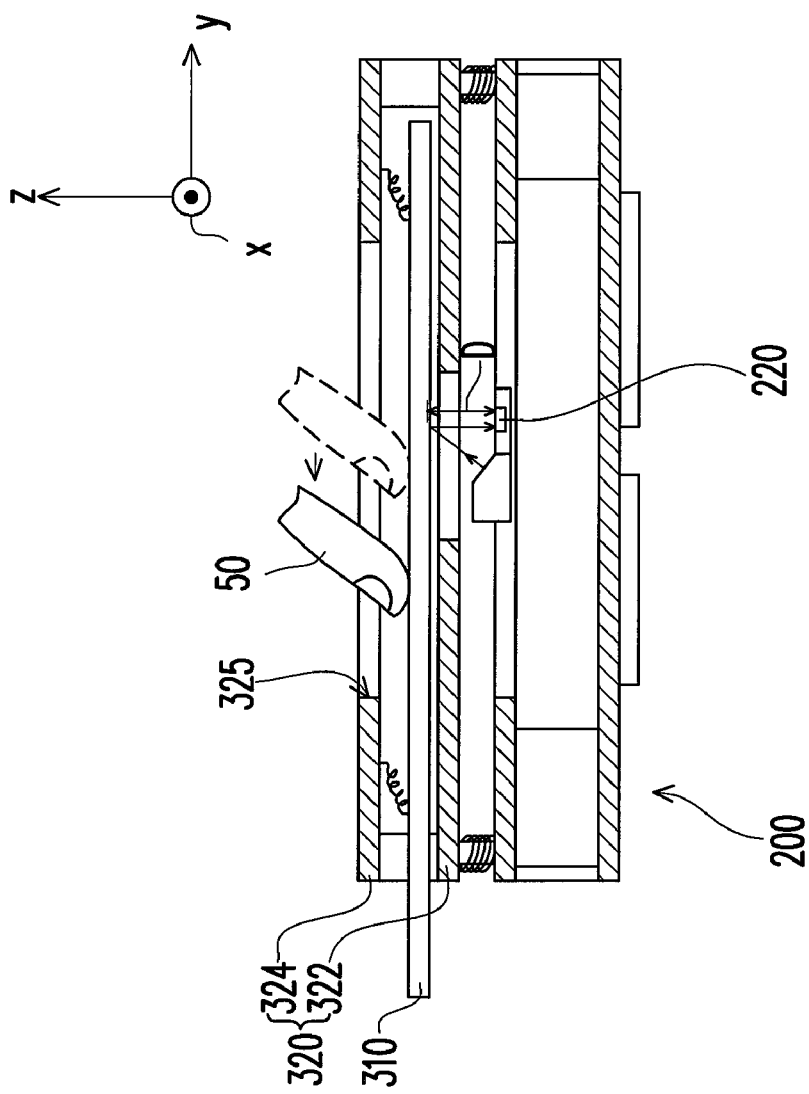

Moreover, referring to FIG. 2C, the user can push the sliding sheet 310 along a direction perpendicular to the arrangement direction R1 through the first finger 50. For example, the first finger 50 can push the sliding sheet 310 along the x direction, the y direction or any direction parallel to the x-y plane. In the present embodiment, the first finger 50 pushes the sliding sheet 310 along a −y direction. Therefore, the optical sensor 220 senses a movement of the sliding sheet 310 relative to the optical mouse module 200 along the direction perpendicular to the arrangement direction R1, and generates an electrical signal. In the present embodiment, the signal output module 260 (shown in FIG. 1A) can convert the electrical signal generated in the optical mouse module 200 into a wireless signal, and transmit the wireless signal to the wireless signal receiver of the computer, so as to control a movement of the cursor on the screen.

Figure 2D:
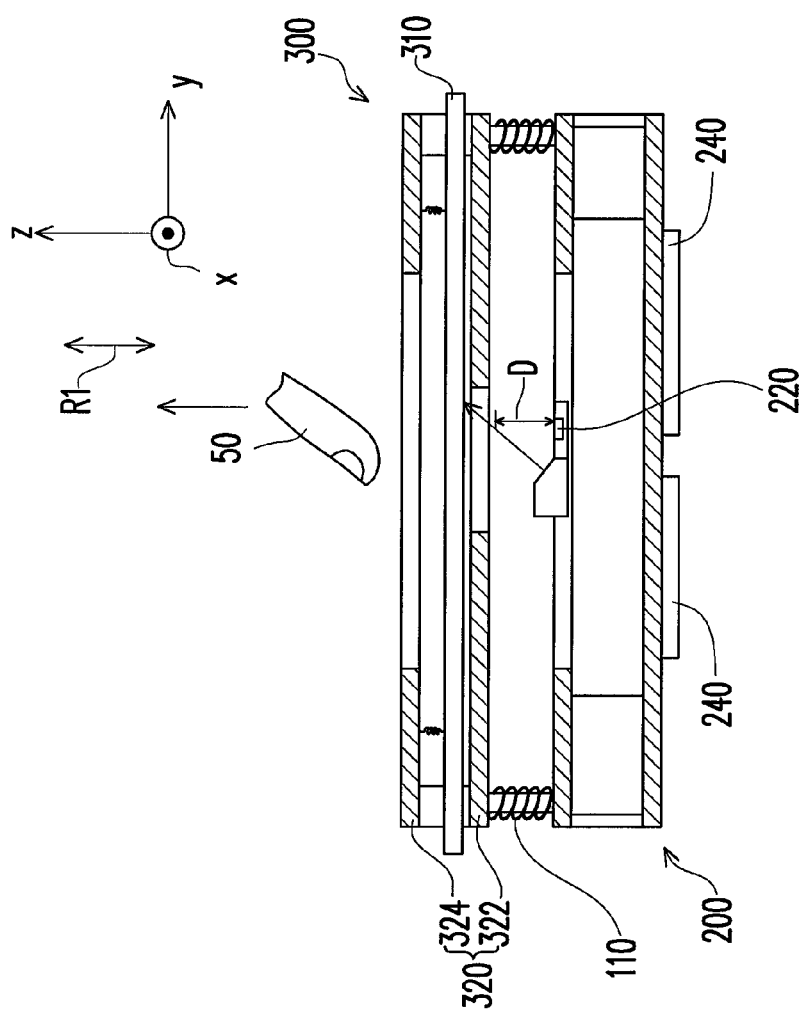
Figure 3:
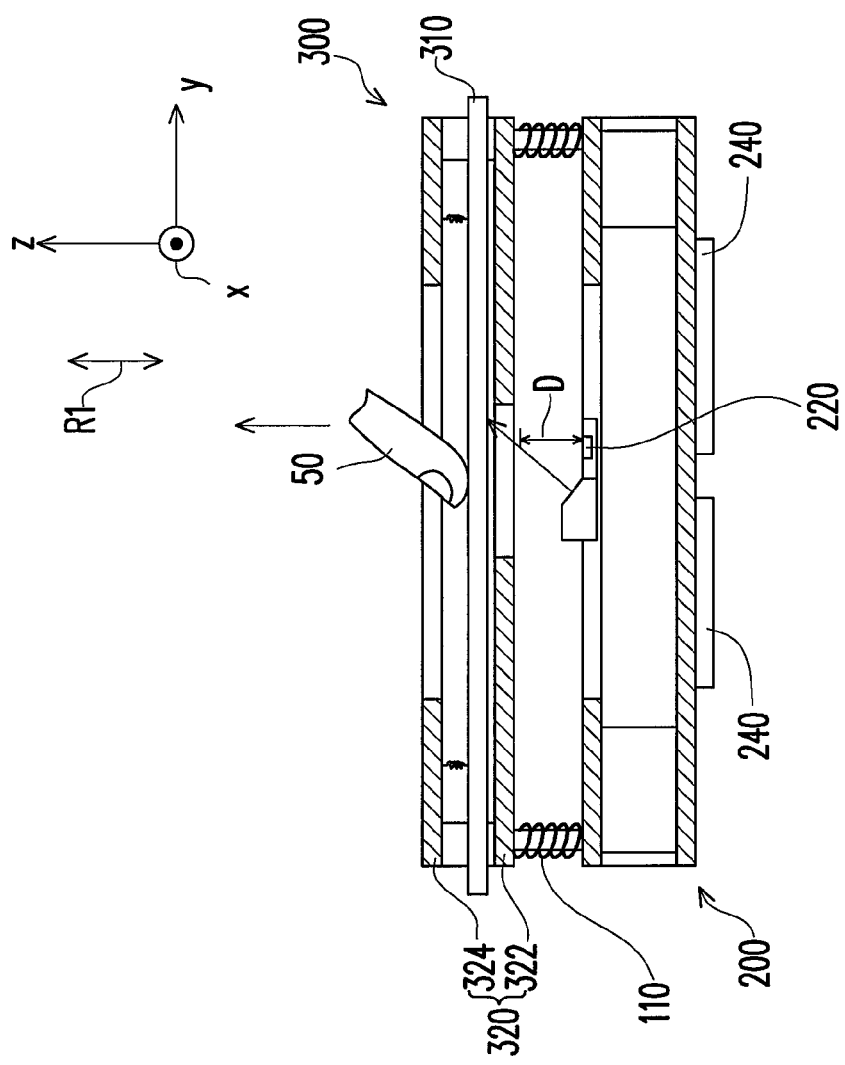
FIG. 3 is a diagram illustrating another variation of FIG. 2D.

Next, referring to FIG. 2D, the first finger 50 leaves the sliding sheet 310 (as that shown in FIG. 2D), or a pressing force of the first finger 50 to the sliding sheet 310 is less than an elastic restoring force formed by coupling the sliding sheet 310 to the optical mouse module 200 (in an embodiment, the pressing force of the first finger 50 is less than the restoring force of the elastic device 110, as that shown in FIG. 3), so that the sliding sheet 310 is rebounded back to outside of the sensible distance D due to the elastic restoring force. In detail, the restoring force of the elastic device 110 rebounds the casing 320 towards a direction apart from the optical mouse module 200, and now the casing 320 pushes the sliding sheet 310 to outside of the sensible distance D. In the present embodiment, when the pressing force of the first finger 50 to the sliding sheet 310 is less than the restoring force of the elastic device 110, or when the first finger 50 leaves the sliding sheet 310, the sliding sheet 310 is adapted to be rebounded back to a specific position relatively to the mouse pad module 300 along a direction perpendicular to the arrangement direction R1. For example, the sliding sheet 310 is rebounded from a position shown in FIG. 2C back to the specific position shown in FIG. 2D, i.e. back to a position that a central area of the sliding sheet 310 is aligned to the optical sensor 220. Therefore, if the first finger 50 pushes the sliding sheet 310 to a position most far away from the aforementioned specific position (i.e. the central position) according to the step shown in FIG. 2C, and the cursor on the screen is still not moved to a predetermined position along a direction corresponding to the moving direction of the sliding sheet 310, the user can leave the first finger 50 from the sliding sheet 310, so that the sliding sheet 310 is rebounded back to the central position. Next, the user can repeat the steps shown in FIG. 2B and FIG. 2C to move the cursor to the predetermined position along the direction corresponding to the moving direction of the sliding sheet 310.

Figure 2E:
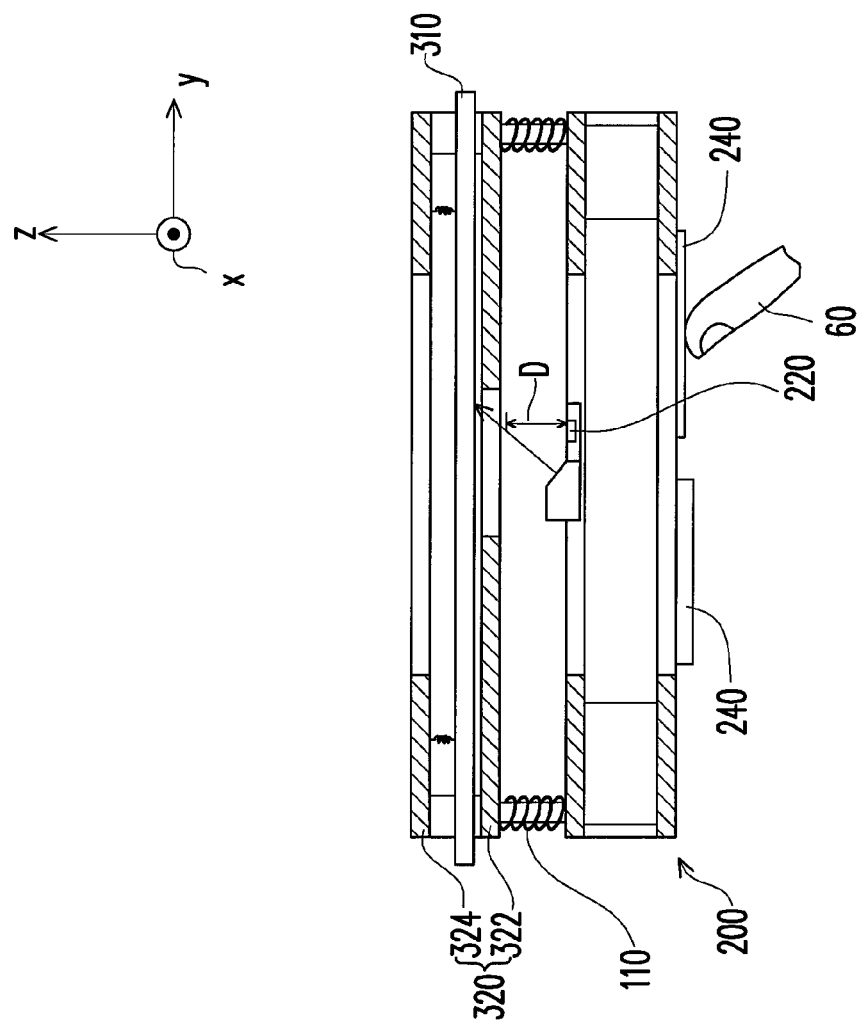

Referring to FIG. 2E, the user can use a second finger 60 to press the button 240. It should be noticed that the operation that the second finger 60 presses the button 240 can also be simultaneously performed in the steps shown in FIG. 2B and FIG. 2C. In the present embodiment, one of the first finger 50 and the second finger 60 is, for example, a thumb of the user, and another one of the first finger 50 and the second finger 60 is, for example, an index finger, a middle finger, a ring finger or a little finger of the user.

Since in the input apparatus 100 of the present embodiment, the optical mouse module 200 and the mouse pad module 300 are integrated, the handheld operation can be implemented. For example, the handheld operation is achieved according to the operation method (the steps shown in FIGS. 2A-2E) of the input apparatus of the present embodiment. The so-called handheld operation refers to that an operation can be performed without placing the input apparatus 100 on a plane, and the user can operate the input apparatus 100 by holding it at any position in the space, so as to improve a usage convenience of the input apparatus 100. Especially when the computer is used for briefing presentation, the user can operate the input apparatus to move the cursor on the screen while leaving the desk. Therefore, since when the cursor is required to be moved, the user can operate the input apparatus 100 at any place without going back to the desk, a degree of fluency and efficiency of the conference can be increased.

Moreover, since the existed conventional optical mouse module 200 and the mouse pad module 300 having a simple structure can be integrated to complete fabricating the input apparatus 100, the input apparatus 100 has a low fabrication cost, so that a market competitiveness thereof is improved. Moreover, a confined space can be formed between the sliding sheet 310 and the optical sensor 220, so that a chance that the sliding sheet 310 and the optical sensor 220 are contaminated by dust can be reduced, so as to improve a reliability of the input apparatus 100.

In addition, in the operation method of the input apparatus of the present embodiment, since actions that the first finger 50 pushes the sliding sheet 310 and leaves the sliding sheet 310 or exerts the pressing force less than the restoring force of the elastic device 110 to rebound the sliding sheet 310 are quite simple, such operation method is easy to be accepted by the user. Moreover, in the operation method of the input apparatus 100 of the present embodiment, the first finger 50 and the second finger 60 are located at two opposite sides of the input apparatus 100 for performing operations, which avails implementing the handheld operation, and improving a holding stability.

Figure 4:
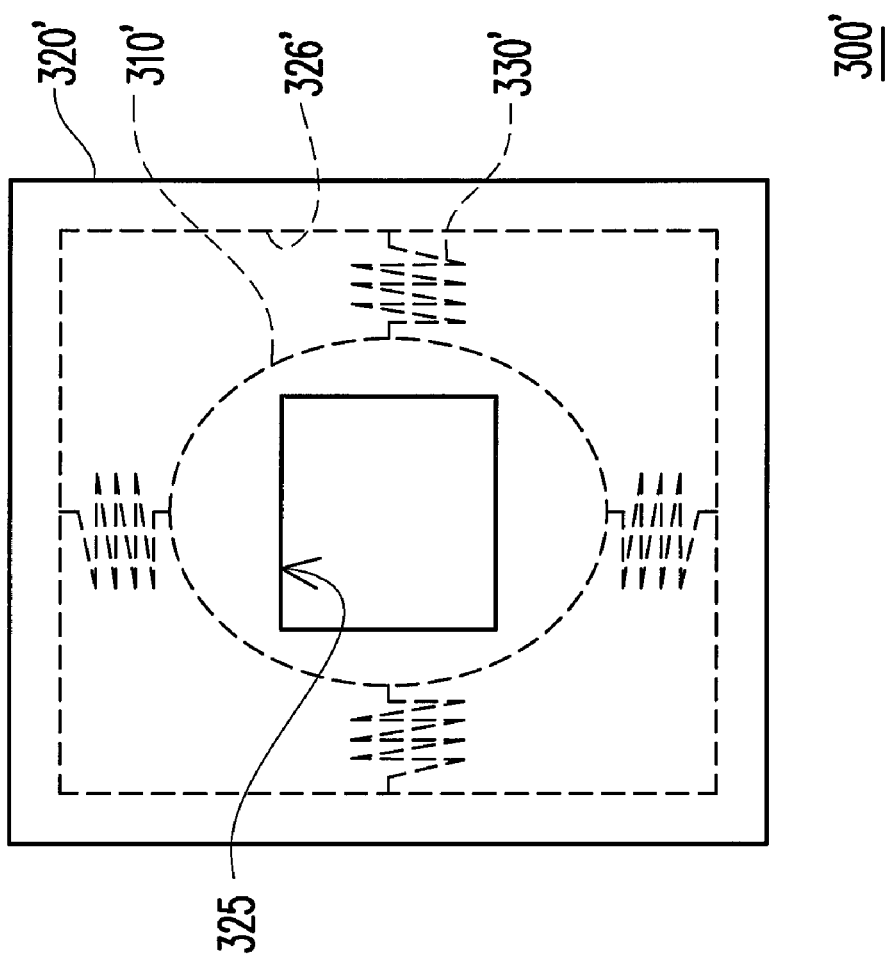
FIG. 4 is a top perspective view of a mouse pad module according to another embodiment of the disclosure.

FIG. 4 is a top perspective view of a mouse pad module according to another embodiment of the disclosure, which is a figure observed along the z direction of FIG. 1A. Referring to FIG. 4, the mouse pad module 300' of the present embodiment is similar to the mouse pad module 300 of FIG. 1A, and differences therebetween are described as follows. In the mouse pad module 300', a casing 320' does not have side openings (for example, the side openings 340 of FIG. 1A), and a sliding sheet 310' does not have side protrusions (for example, the protrusions 312 of FIG. 1A). Moreover, elastic devices 330' connect the sliding sheet 310' and a sidewall 326' of the casing 320', and the elastic devices 330' are, for example, springs.

Figure 5:
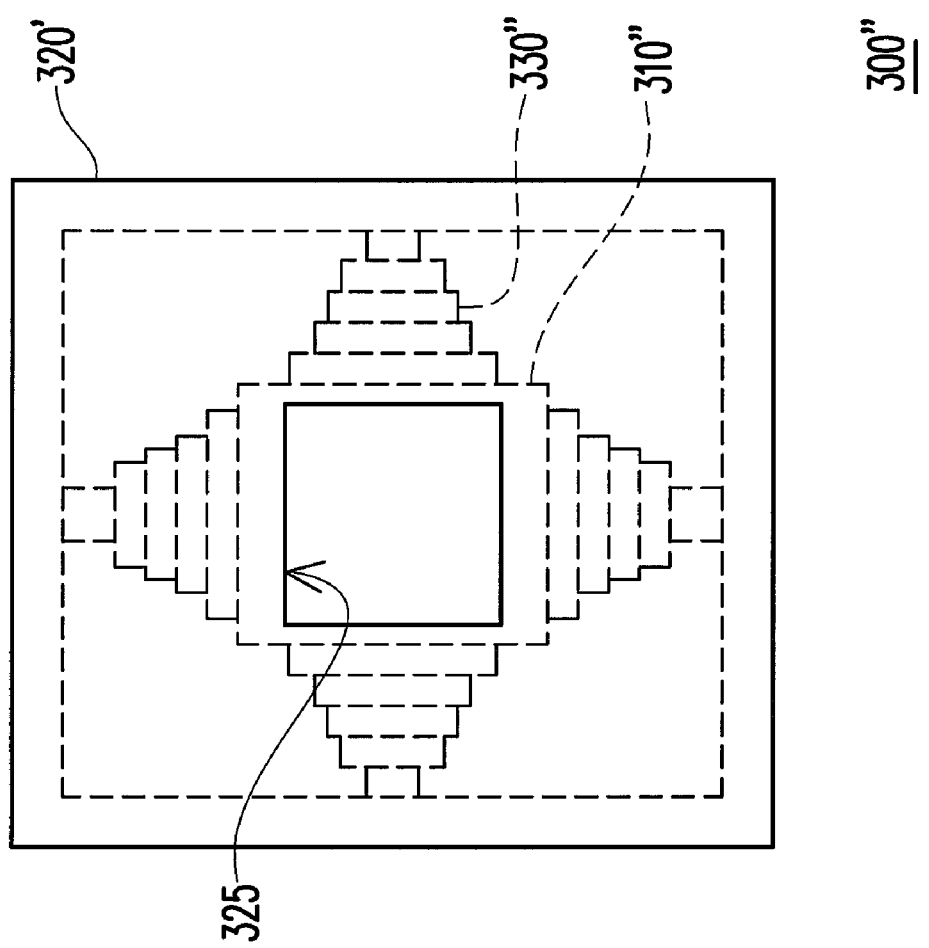
FIG. 5 is a top perspective view of a mouse pad module according to still another embodiment of the disclosure.

FIG. 5 is a top perspective view of a mouse pad module according to still another embodiment of the disclosure, which is a figure observed along the −z direction of FIG. 1A. Referring to FIG. 5, the mouse pad module 300" of the present embodiment is similar to the mouse pad module 300' of FIG. 4, and a main difference therebetween is that in the mouse pad module 300", stretchable parts 330" are used to replace the elastic devices 330' of FIG. 4. The stretchable parts 330" can be stretched or compressed according to positions of a sliding sheet 310".

Figure 6:
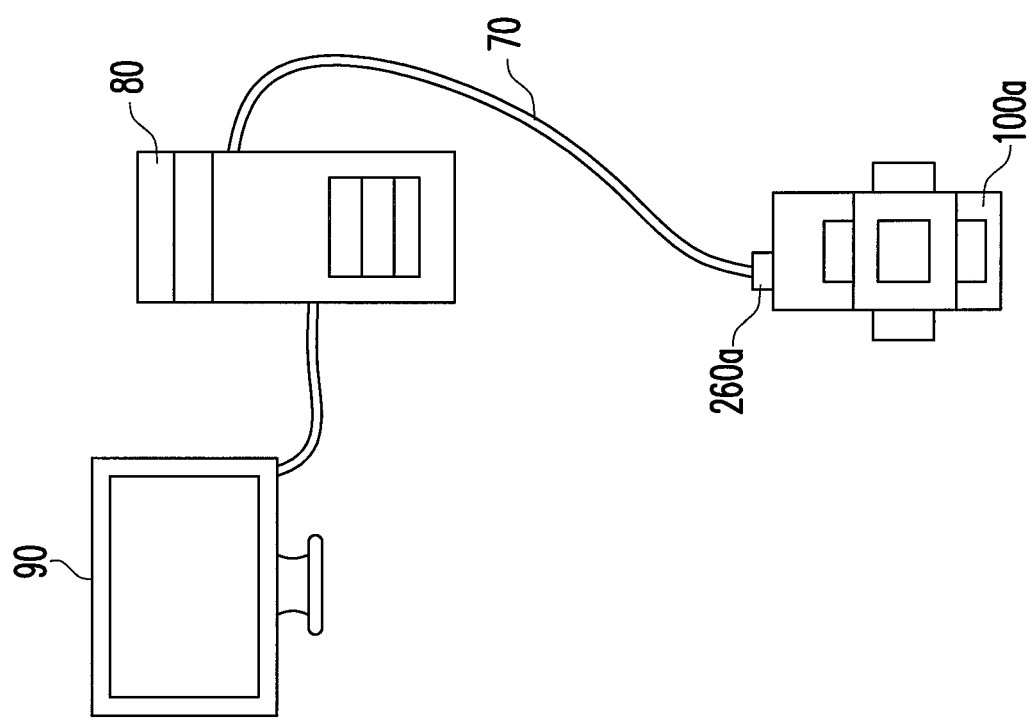
FIG. 6 is a schematic diagram illustrating a computer system applying an input apparatus according to another embodiment of the disclosure.

FIG. 6 is a schematic diagram illustrating a computer system applying an input apparatus according to another embodiment of the disclosure. Referring to FIG. 6, the input apparatus 100a of the present embodiment is similar to the input apparatus 100 (shown in FIG. 1A), and a difference there between is that a signal output module 260a of the input apparatus 100a is a cable signal output module, which is connected to a computer 80 through a signal transmission line 70, so as to control a cursor on a screen 90 connected to the computer 80.

Figure 7:
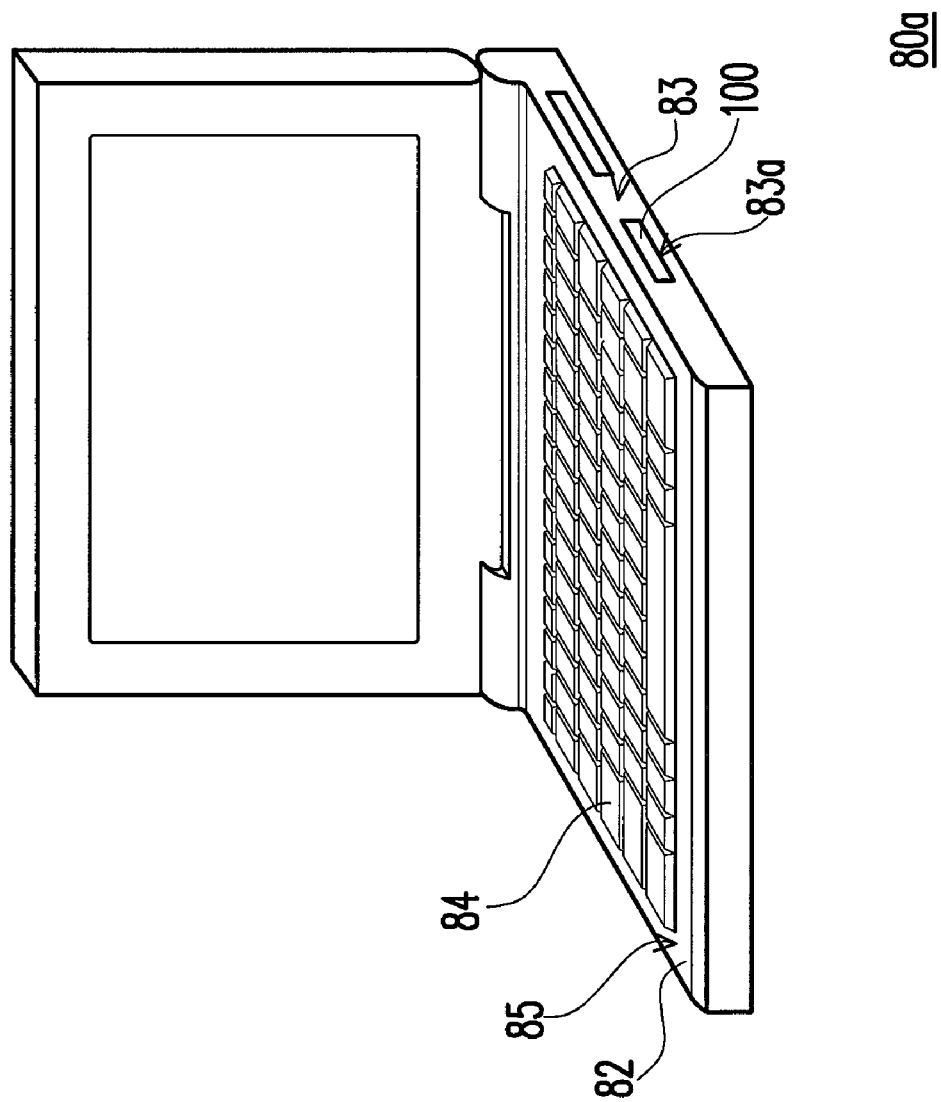
FIG. 7 is a schematic diagram illustrating a notebook computer applying an input apparatus according to another embodiment of the disclosure.

FIG. 7 is a schematic diagram illustrating a notebook computer applying an input apparatus according to another embodiment of the disclosure. Referring to FIG. 7, in the present embodiment, when the input apparatus 100 (shown in FIG. 1A) is not used, it can be disposed in a groove 83a at a side surface 83 of a base 82 of the notebook computer 80a, and when the input apparatus 100 is used, the user can fetch the input apparatus 100 from the groove 83a, and operate it in a handheld approach. Since the input apparatus 100 does not occupy an area of a surface 85 asides a keyboard 84 in the base 82, a size of the base 82 can be further miniaturized, so as to reduce a whole size of the notebook computer. In other embodiments, the input apparatus 100 of FIG. 7 can also be replaced by the input apparatus 100a of FIG. 6.

It should be noticed that the operation method of the input apparatus of other embodiments can also be applied to the input apparatus of other embodiments (for example, the input apparatus 100a of FIG. 6), and the detailed operation steps thereof are similar as that illustrated in FIGS. 2A-2E, and the above embodiment can be referred for detailed descriptions.

In summary, since in the input apparatus according to the embodiments of the disclosure, the optical mouse module and the mouse pad module are integrated, the handheld operation can be achieved, by which the user can operate the input apparatus by holding it at any position in the space, so as to improve a usage convenience of the input apparatus. Especially when the computer is used for briefing presentation, the user can operate the input apparatus to move the cursor on the screen while leaving the desk. Therefore, since when the cursor is required to be moved, the user can operate the input apparatus at any place without going back to the desk, a degree of fluency and efficiency of the conference can be increased.

Moreover, since the existed conventional optical mouse module and the mouse pad module having a simple structure can be integrated to complete fabricating the input apparatus according to the embodiments of the disclosure, the input apparatus may have a low fabrication cost, so that a market competitiveness thereof is improved.

Further, in the operation method of the input apparatus according to the embodiments of the disclosure, since actions that the first finger pushes the sliding sheet and leaves the sliding sheet to rebound the sliding sheet are quite simple, such operation method is easy to be accepted by the user. Moreover, in the operation method of the input apparatus according to the embodiments of the present embodiment, the first finger and the second finger are located at two opposite sides of the input apparatus for performing operations, which avails implementing the handheld operation, and improving a holding stability.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. An input apparatus, comprising:
an optical mouse module, comprising a light source and an optical sensor, wherein the light source is adapted to emit a light beam, and the optical sensor has a sensible distance; and a mouse pad module, disposed on the optical mouse module, the mouse pad module comprising a sliding sheet elastically coupled to the optical mouse module, wherein the sliding sheet is adapted to move in a three-dimensional space, the optical sensor and the sliding sheet are arranged along an arrangement direction, when the sliding sheet is pressed and caused to enter within the sensible distance of the optical sensor and moves along a direction perpendicular to the arrangement direction, the sliding sheet reflects the light beam to the optical sensor, so that the optical sensor senses a movement of the sliding sheet relative to the optical mouse module along a direction perpendicular to the arrangement direction, and when the sliding sheet is not pressed, an elastic force formed by coupling the sliding sheet to the optical mouse module rebounds the sliding sheet from within the sensible distance back to outside of the sensible distance, so that the optical sensor is unable to sense a movement of the sliding sheet relative to the optical mouse module along the direction perpendicular to the arrangement direction.

2. The input apparatus as claimed in claim 1, wherein the mouse pad module further comprises a casing elastically coupled to the optical mouse module, the casing is adapted to move relatively to the optical mouse module along the arrangement direction, and the casing has a containing space for containing at least a part of the sliding sheet.

3. The input apparatus as claimed in claim 2, wherein the mouse pad module further comprises at least one first elastic device coupled to the casing and the sliding sheet, and when the sliding sheet is not pressed, a restoring force of the first elastic device is adapted to rebound the sliding sheet back to a specific position relatively to the casing along a direction substantially perpendicular to the arrangement direction.

4. The input apparatus as claimed in claim 2, wherein the casing comprises:
a lower cover, disposed on the optical mouse module, adapted to move along the arrangement direction, and the lower cover having a light pervious opening; and
an upper cover, connected to the lower cover and elastically coupled to the optical mouse module, the upper cover having an operation opening, wherein the sliding sheet is disposed between the lower cover and the upper cover, and the light beam is adapted to be transmitted to the sliding sheet through the light pervious opening.

5. The input apparatus as claimed in claim 4, wherein the input apparatus further comprises at least one second elastic element coupled to the optical mouse module and the casing, when the sliding sheet is pressed, the sliding sheet pushes the casing to move towards the optical mouse module, and when the sliding sheet is not pressed, or when a pressing force to the sliding sheet is less than an elastic force of the second elastic device, the elastic force of the second elastic device rebounds the casing back towards a direction apart from the optical mouse module, and now the casing pushes the sliding sheet to outside of the sensible distance of the optical sensor.

6. The input apparatus as claimed in claim 5, wherein the lower cover has at least one positioning hole, the optical mouse module has at least one positioning pillar, and the positioning pillar is adapted to be inserted in the positioning hole.

7. The input apparatus as claimed in claim 6, wherein the second elastic device is a compression spring surrounding the positioning pillar.

8. The input apparatus as claimed in claim 1, wherein the light source and the optical sensor are disposed at a side of the optical mouse module facing to the mouse pad module, and the optical mouse module further comprises at least one button disposed at a side of the optical mouse module away from the mouse pad module.

9. The input apparatus as claimed in claim 1, wherein the optical mouse module further comprises a signal output module electrically connected to the optical sensor.

10. The input apparatus as claimed in claim 9, wherein the signal output module is a wireless signal output module.

11. The input apparatus as claimed in claim 9, wherein the signal output module is a cable signal output module.

12. An operation method of an input apparatus, the input apparatus comprising an optical mouse module and a mouse pad module, the optical mouse module comprising a light source and an optical sensor, the optical sensor having a sensible distance, the mouse pad module being disposed on the optical mouse module, the mouse pad module comprising a sliding sheet elastically coupled to the optical mouse module, and the optical sensor and the sliding sheet being arranged along an arrangement direction, the operation method of the input apparatus comprising:
pressing the sliding sheet by a first finger and causing the sliding sheet to enter within the sensible distance of the optical sensor by the first finger;
pushing the sliding sheet along a direction perpendicular to the arrangement direction by the first finger; and
leaving the first finger from the sliding sheet or letting a pressing force of the first finger to the sliding sheet to be less than an elastic restoring force formed by coupling the sliding sheet to the optical mouse module, so that the sliding sheet is rebounded from within the sensible distance back to outside of the sensible distance due to the elastic force formed by coupling the sliding sheet to the optical mouse module.

13. The operation method of the input apparatus as claimed in claim 12, wherein when the first finger leaves the sliding sheet or when the pressing force of the first finger is less than the elastic restoring force formed by coupling the sliding sheet to the optical mouse module, the sliding sheet is adapted to be rebounded back to a specific position relatively to the mouse pad module along a direction perpendicular to the arrangement direction.

14. The operation method of the input apparatus as claimed in claim 12, wherein the light source and the optical sensor are disposed at a side of the optical mouse module facing to the mouse pad module, and the optical mouse module further comprises at least one button disposed at a side of the optical mouse module away from the mouse pad module, and the operation method of the input apparatus further comprises pressing the button by a second finger.

* * * * *